US012798335B2

(12) United States Patent
Üstünberk et al.

(10) Patent No.: US 12,798,335 B2
(45) Date of Patent: Nov. 17, 2026

(54) VEHICLE COCKPIT COMPONENT PROVIDED WITH AN IMPROVED HEATING DEVICE

(71) Applicant: MARTUR ITALY S.R.L., Milan (IT)

(72) Inventors: Can Üstünberk, Grugliasco (IT); Tiziano Serra, Grugliasco (IT); Gökçen Ukuser, Grugliasco (IT); Serkan Baş, Grugliasco (IT); Marco Borri, Grugliasco (IT)

(73) Assignee: MFI ITALY ENGINEERING S.R.L., Milan (IT)

( * ) Notice: Subject to any disclaimer, the term of this patent is extended or adjusted under 35 U.S.C. 154(b) by 1070 days.

(21) Appl. No.: 17/764,174

(22) PCT Filed: Aug. 2, 2021

(86) PCT No.: PCT/IB2021/057053

§ 371 (c)(1),
(2) Date: Mar. 26, 2022

(87) PCT Pub. No.: WO2022/029602

PCT Pub. Date: Feb. 10, 2022

(65) Prior Publication Data

US 2022/0371406 A1 Nov. 24, 2022

(30) Foreign Application Priority Data

Aug. 7, 2020 (IT) ........................ 102020000019798

(51) Int. Cl.

*H05B 3/34* (2006.01)
*B60H 1/22* (2006.01)

(Continued)

(52) U.S. Cl.

CPC ......... *B60H 1/2227* (2019.05); *B60N 2/5685* (2013.01); *H05B 1/0238* (2013.01); *H05B 3/34* (2013.01); *H05B 2203/016* (2013.01)

(58) Field of Classification Search

CPC .. B60H 1/2227; B60N 2/5685; H05B 1/0238; H05B 3/34; H05B 2203/016

(Continued)

(56) References Cited

U.S. PATENT DOCUMENTS 4,910,389 A * 3/1990 Sherman ................ H01C 7/027 219/505
5,834,734 A * 11/1998 Ogata ...................... H05B 3/00 219/541

(Continued)

FOREIGN PATENT DOCUMENTS

DE 202004011314 U1 12/2005
FR 3089894 A1 * 6/2020 ........... B60N 2/0033

(Continued)

OTHER PUBLICATIONS

International Search Report and Written Opinion of the International Searching Authority issued for International PCT Application No. PCT/IB2021/057053 on Nov. 2, 2021.

*Primary Examiner* — Jimmy Chou
(74) *Attorney, Agent, or Firm* — Howson & Howson LLP

(57) ABSTRACT

A vehicle cockpit component (10, 12, 14, 16, 18) with a heating device that comprises a polyurethane-based foam charged and/or impregnated with an electrically conductive filler (1) which is directly connected to means for generating a potential difference (7*a*, 7*b*; 11*a*, 11*b*; 13*a*, 13*b*) for generating heat by Joule effect is provided. The polyurethane-based foam charged and/or impregnated with an electrically conductive filler (1) is used for manufacturing the padding or the upholstery of the vehicle cockpit component (10, 12, 14, 16, 18) or one or more portions of the padding (Continued)

or upholstery. The heating device is intrinsic to the vehicle cockpit component and does not require the provision of additional, separate components.

20 Claims, 7 Drawing Sheets

(51) Int. Cl.
*B60N 2/56* (2006.01)
*H05B 1/02* (2006.01)

(58) Field of Classification Search
USPC .......................................................... 219/202
See application file for complete search history.

(56) References Cited

U.S. PATENT DOCUMENTS

| | | | | |
|---|---|---|---|---|
| 7,741,582 | B2 * | 6/2010 | Howick | B60N 2/5685 219/202 |
| 9,637,034 | B2 | 5/2017 | Himmel, IV et al. | |
| 9,676,308 | B2 * | 6/2017 | Zhang | B60N 2/5621 |
| 10,314,111 | B2 | 6/2019 | Barfuss et al. | |
| 10,906,442 | B2 | 2/2021 | Klein | |
| 11,279,273 | B1 | 3/2022 | Ustunberk | |
| 11,787,310 | B2 | 10/2023 | Kozlowski et al. | |
| 2002/0170902 | A1 * | 11/2002 | Check | B29C 66/727 219/202 |
| 2004/0100131 | A1 * | 5/2004 | Howick | B60N 2/5678 297/180.12 |
| 2005/0103773 | A1 * | 5/2005 | Diemer | H05B 3/34 219/217 |
| 2005/0242081 | A1 * | 11/2005 | Howick | B60N 2/5685 219/529 |
| 2006/0157465 | A1 * | 7/2006 | Karollus | H05B 3/34 219/217 |
| 2008/0142494 | A1 * | 6/2008 | Blake | B60N 2/5685 219/217 |
| 2010/0000981 | A1 * | 1/2010 | Diemer | H05B 3/34 219/217 |
| 2011/0147357 | A1 * | 6/2011 | Bokelmann | H05B 3/34 219/202 |
| 2011/0188927 | A1 * | 8/2011 | Mizrahi | B32B 27/36 219/118 |
| 2013/0207422 | A1 * | 8/2013 | Potton | B60N 2/5685 297/180.12 |
| 2015/0114952 | A1 * | 4/2015 | Tai | H05B 3/84 977/932 |
| 2015/0382403 | A1 * | 12/2015 | Philip | H05B 3/12 219/541 |
| 2016/0332549 | A1 * | 11/2016 | Marquette | B60N 2/5657 |
| 2017/0184339 | A1 | 6/2017 | Fukuda et al. | |
| 2019/0126792 | A1 * | 5/2019 | Kozlowski | B60N 2/56 |
| 2019/0135077 | A1 | 5/2019 | Lee et al. | |
| 2019/0184869 | A1 * | 6/2019 | Galbreath | B60N 2/5642 |

FOREIGN PATENT DOCUMENTS

| | | | |
|---|---|---|---|
| JP | 11-128025 | A | 5/1999 |
| JP | 2006-008773 | A | 1/2006 |
| JP | 2007-305603 | A | 11/2007 |
| JP | 2019-026232 | A | 2/2019 |

* cited by examiner

VEHICLE COCKPIT COMPONENT PROVIDED WITH AN IMPROVED HEATING DEVICE

TECHNICAL FIELD

The present invention relates to a vehicle cockpit component provided with an improved heating device.

More particularly, but not exclusively, the present invention relates to a vehicle seat provided with an improved heating device.

The present invention relates to a vehicle cockpit component provided with a heating device which is intrinsic to the structure of the vehicle cockpit component, e.g. of the vehicle seat.

BACKGROUND ART

Vehicle seats provided with heating devices, aimed to improve the users' comfort, are known and widely used.

In general, such heating devices include electric/electronic components which are separate and independent from the vehicle seat, and which are incorporated into the vehicle seat during the assembling process of the latter.

By way of example, such heating devices may include electric plates which are arranged between the upholstery and the padding of the vehicle seat at the cushion area and/or at the backrest area.

As an alternative, such heating devices may include thermoelectric components, adapted to selectively perform both heating and cooling of the vehicle seat cushion and/or backrest.

Such heating device may optionally include means for generating an air flow through the vehicle seat cushion and/or backrest, as well as a piping arrangement for air circulation.

Such known heating device have several drawbacks.

First of all, they require a significant energy consumption for reaching and maintaining a desired temperature, sufficient for ensuring users' comfort.

Secondly, they have a relevant thermal inertia, so that a quite long time is needed for reaching the desired temperature.

Moreover, the presence of the additional components of such heating devices involves an increase in manufacturing costs and times, as well as in risks of failures and malfunctions due to an incorrect assembly of such additional components in the vehicle seat.

Last but not least, there is a constant request for reducing the weight of the elements of the vehicle cockpit, namely of the vehicle seats, and it is evident that the presence of the components of the heating devices involves an additional weight, which is not desirable.

Document US 2005/0103773 discloses a surface heating with an electrically conductive plastic and a vehicle cockpit component provided with such surface heating. The surface heating includes a carrier and a heating layer, which contains electrically conductive plastic, wherein the heating layer is formed by a flexible film and the carrier is flexible.

The electrically conductive plastic can be foaming or foam-plastic material and electrically conductive polyurethane may be used as the plastic material.

The foaming or foam-plastic material (e.g. electrically conductive polyurethane) in flowable or liquid state is applied by rolling, brushing, or spraying onto the carrier, thus forming an outer film or skin; as an alternative, the heating film can also be separately manufactured, and then joined to the carrier, for instance by cementing or sewing or welding.

According to the disclosure of US 2005/0103773, the surface heating can be applied to a vehicle seat, and in this case the heating film and the carrier can placed over the padding of the vehicle seat, i.e. between the padding and the upholstery, or over the upholstery of the vehicle seat. However, the vehicle heating is not limited to application to vehicle seats and it can also be applied to other cockpit components, such as the instrument panel or even the windshield.

This solution, while having the advantage of replacing discrete elements such as heating plates or pipes by a continuous film, is not free from drawbacks.

More particularly, the heating film and the attached carrier are separate elements that are applied to an existing component of the vehicle cockpit, which involves an increase in both manufacturing time and manufacturing costs.

Moreover, the provision of separate elements and respective means for fastening such element to the vehicle cockpit component result in a poor reliability of the final product, as the connections of such elements with each other and with the vehicle cockpit component can deteriorate over time, with the risk of undesired, relative displacements.

Therefore, the main object of the present invention is to overcome the above-mentioned drawbacks by providing a vehicle seat equipped with a heating device that is intrinsic to the vehicle seat constriction and does not involve the introduction of additional components.

A further object of the present invention is to provide a vehicle seat equipped with a heating device having low energy consumption, as well as low thermal inertia.

SUMMARY OF INVENTION

According to the invention, the vehicle cockpit component is provided with a heating device including a polyurethane-based foam charged and/or impregnated with at least one electrically conductive filler, which device is used for manufacturing a padding and/or an upholstery of the vehicle cockpit component.

The at least one electrically conductive filler may be a carbon-based filler or a metal-based filler, or a combination thereof.

It is possible to "charge" a polyurethane foam with an electrically conductive filler by mixing electrically conductive particles to one of the components used for producing the polyurethane foam.

As an alternative, a polyurethane foam can be "impregnated" with an electrically conductive filler by immersing the polyurethane foam (already formed) in a suitable solution containing electrically conductive particles.

The polyurethane foam thus charged/impregnated acts as a resistive material with good thermal conductivity properties.

Polyurethane foams are commonly used for manufacturing padding of the cushion and the backrest of vehicle seats.

Moreover, polyurethane foams are also used for manufacturing upholstery of the cushion and the backrest of vehicle seats. Namely, a polyurethane foam can be coupled by lamination to the outer aesthetic covering material (which can be made e.g. of polyester, polyamide, leather, and the like) in order to obtain a multilayer upholstery which guarantees an improved comfort to users and facilitates fitting the upholstery itself onto the vehicle seat during manufacturing and assembly processes.

Polyurethane foams are dielectric polymeric materials, i.e. they are electrically insulating. Charging and/or impregnating a polyurethane foam with electrically conductive particles makes the material resistive, i.e. electrically conductive in the presence of an applied voltage.

According to a first aspect of the invention, polyurethane foam is charged with at least one electrically conductive filler, by mixing electrically conductive particles to one of the components used for producing the foam itself. According to well-known statistical percolation theory, a composite material consisting of an insulating matrix charged with an electrically conductive filler undergoes an insulator-to-conductor transition when the conductive filler content is gradually increased. The percolation threshold represents a critical filler content, at which the measured electrical conductivity of the composite material sharply jumps up several orders of magnitude due to the formation of a continuous electrically conducting network. Below the percolation threshold, the conducting network is not established and the electrical properties of the composite material are dominated by the insulating matrix material. On the other hand, if the concentration of the electrically conductive filler is above the percolation threshold, the formation of a conducting network in the composite material is obtained and the composite material behaves as an electrical conductor.

The percolation threshold can be seen as the concentration of particles of electrically conductive filler at which the formation of the first percolative pathway occurs within the insulating matrix. As the concentration of conductive particles increases, there is an increase in the electrical conductivity of the polyurethane foam until a maximum value is reached, corresponding to the saturation of the percolative pathways.

The percolation threshold, as well as the saturation threshold, depends on the specific characteristics of the matrix and of the filler.

In the range between percolation threshold and saturation threshold, polyurethane foams charged with electrically conductive fillers act as resistive materials with good thermal conductivity properties.

Therefore, according to the invention, the vehicle cockpit component is provided with a heating device including a polyurethane-based foam charged with electrically conductive particles, in which the concentration of said electrically conductive particles is higher than the percolation threshold, and preferably comprised between the percolation threshold and the saturation threshold, and such heating device is used for manufacturing a padding and/or an upholstery of the vehicle cockpit component.

According to a second aspect of the invention, the polyurethane foam, already formed, is impregnated by immersion in a solution containing at least one electrically conductive filler.

Therefore, according to the invention, the vehicle cockpit component is equipped with a heating device comprising a polyurethane foam impregnated with electrically conductive particles, wherein the concentration of said electrically conductive particles is higher than a minimum threshold, corresponding to the minimum concentration of conductive particles necessary to trigger a first continuous conductive pathway on the internal/external walls of the polyurethane foam, and preferably comprised between this said minimum threshold and a maximum threshold, corresponding to the concentration of conductive particles that leads to the uniform and homogeneous impregnation of the polyurethane foam and to the saturation of all the internal and external surface bonds, and such heating device is used for manufacturing a padding and/or an upholstery of the vehicle cockpit component.

Use of such polyurethane foams charged with electrically conductive fillers is known in the art, for instance from US 2019/184869 and US 2019/126792.

However, in prior art polyurethane foams charged with electrically conductive fillers are merely used for improving the transmission of heat from a conventional heating device embedded in the padding of the vehicle seat and the outer surface of said vehicle seat.

On the other hand, according to the present invention, the polyurethane foams charged and/or impregnated with electrically conductive fillers is used for generating heat: the basic idea of the invention is that such polyurethane foams charged and/or impregnated with electrically conductive fillers, being a resistive material, will generate heat by Joule effect when subjected to a potential difference, due to the electrical current passing therethrough.

To this purpose, in the vehicle seat according to the invention the polyurethane foam charged and/or impregnated with electrically conductive fillers is directly connected with means for generating a voltage difference.

According to a preferred embodiment of the invention, the polyurethane foam charged and/or impregnated with electrically conductive fillers is arranged between and coupled to a pair of metal electrodes, which are bonded to the foam by means of a conductive glue or paste or resin.

According to another preferred embodiment of the invention, the polyurethane foam charged with electrically conductive fillers is arranged between and coupled to a pair of electrodes obtained by means of flexible printed circuit boards (FPCB).

According to a still another preferred embodiment of the invention, the surface of the polyurethane foam charged and/or impregnated with electrically conductive fillers is printed with electrically conductive inks for forming a pair of electrodes.

According to a further preferred embodiment of the invention, a metal electrodes arrangement is embedded in the polyurethane foam charged and/or impregnated with electrically conductive fillers.

Furthermore, in order to effectively use the polyurethane foams charged with electrically conductive fillers for generating heat, the concentration of electrically conductive particles is chosen so as to be close to the saturation threshold.

For instance, considering the range between the percolation threshold and the saturation threshold, the concentration of electrically conductive particle will be selected in the 50% of said range closer to the saturation threshold, preferably in the 20% of said range closer to the saturation threshold.

It is evident that combinations of the above-mentioned techniques, as well as other technique within the reach of the person skilled in the art, could also be used for manufacturing the electrodes.

Such electrodes will be suitably connected an electronic circuit for control and power generation. More particularly, such control and power generation circuit will provide the electrodes with an operating potential difference, obtained by drawing energy from the vehicle battery.

According to a preferred embodiment of the invention, the polyurethane foam charged with electrically conductive fillers is used as padding of the cushion and/or of the backrest of the vehicle seat.

According to an alternative preferred embodiment of the invention, the polyurethane foam charged and/or impregnated with electrically conductive fillers is used as upholstery for the cushion and/or for the backrest of the vehicle seat.

In this embodiment, the polyurethane foam charged and/or impregnated with electrically conductive fillers is laminated to an outer decorative material so as to form a multilayer upholstery for the cushion and/or for the backrest of the vehicle seat.

It will be evident to the person skilled in the art that in both the above-mentioned embodiments, an existing component of the vehicle seat—once suitably modified by introduction of electrical conductive fillers—is exploited for obtaining the heat generating device, thus obtaining a heating device which is intrinsic to the structure in the vehicle seat constriction.

Such arrangement is remarkably different with respect to the solution disclosed in US 2005/0103773, according to which a heating device made as a film, along with a carrier, is separately manufactured and applied to the existing component of the vehicle seat.

Such arrangement involves evident advantages.

By eliminating the need for separate heating devices, the overall number of components of the vehicle seat is reduced, which results in reduction of manufacturing costs and time. Moreover, the risk of errors in assembling the vehicle seat is also significantly reduced.

By eliminating the need for separate heating devices, the overall weight of the vehicle seat is also reduced, which is highly desirable for vehicle manufacturers.

Advantageously, the heating device obtained according to the teachings of the present invention does not require appropriate sensors for temperature control as it can be used as a sensor itself: as the temperature of the foam changes, the foam resistance also varies, so that the control circuit can monitor the resistance variation and derive information about temperature therefrom.

By eliminating the need for a temperature sensing arrangement, the number of overall components can be further reduced, with corresponding reduction in manufacturing costs, assembling time and risk of errors and overall weight.

On the other hand, such arrangement involves additional technical problems to be solved with respect to the solution disclosed in US 2005/0103773, so that it is not obvious in view of the teachings of this document.

More particularly, in the claimed invention the same device has to play two different functions: heating and, at the same time, providing a comfortable support to the user.

These functions are carried out by different elements in the arrangement disclosed in US 2005/0103773. Instead, in the present invention the heating device itself is used as padding and/or upholstery of the vehicle cockpit component.

This means that the mechanical features of the resulting polyurethane-based foam are as essential as the heat conduction behaviour of such foam.

Accordingly, both the amount of particles of electrically conductive filler and the procedure by means of which said particles are added (charged/impregnated) to the foam shall be selected by taking into account both the mechanical properties and the heat conduction properties.

More particularly, the risk that the foam structure collapses due to the addition of these particles of electrically conductive filler shall be avoided.

This problem is neither dealt with nor even mentioned in US 2005/0103773, since in the disclosed arrangement the mechanical properties of the heating film are not relevant.

In a preferred embodiment of the invention, in order to prevent the foam structure from collapsing due to the addition of the particles of electrically conductive filler, one or more blowing agents are also added to the polyurethane-based foam.

In detail, the type and amount of blowing agent(s) are selected as a function of the amount of particle of electrically conductive filler.

Although the main application to the invention is manufacturing of vehicle seats provided with an integrated heating device, such application is not to be intended in a limiting way.

To the contrary, the invention can be advantageously implemented for manufacturing any other component of the vehicle cockpit that comprises or may comprise a padding and/or an upholstery.

For instance, the present invention can be implemented for manufacturing the inner panels of vehicle doors or the cockpit headliner.

Such application could be particularly interesting for electric vehicle, in which it is not possible to exploit the heat generated by an IC engine for heating the space inside the cockpit.

BRIEF DESCRIPTION OF DRAWINGS

Further features and advantages of the invention will become more evident from the detailed description of some preferred embodiments thereof, given by way of non-limiting example, with reference to the attached drawings, in which.

DESCRIPTION OF EMBODIMENTS

In the following description of preferred embodiments of the invention, reference will be made to a vehicle seat provided with a heating device. More specifically, reference will be made to a vehicle seat provided with a heating device at the cushion area and/or at the backrest area.

Such application, although particularly advantageous, shall not be intended as limiting and the invention could be also implemented for manufacturing several other components of a vehicle cockpit.

First of all, in case the vehicle seats comprise one or more armrests and/or a headrest, it is possible to envisage to apply the invention to the manufacturing of such armrest(s) and/or headrest.

Secondly, the invention finds application in manufacturing components of the cockpit other than the vehicle seats. In general, the invention can be used for manufacturing any component of the cockpit that comprises a padding and/or an upholstery, including the inner panels of the vehicle doors and the cockpit headliner.

The invention essentially relates to a cockpit component, such as a vehicle seat, provided with a heating device including a polyurethane-based foams charged and/or impregnated with an electrically conductive filler, such device being used for manufacturing the padding and/or the upholstery of the cockpit component.

Figure 1:
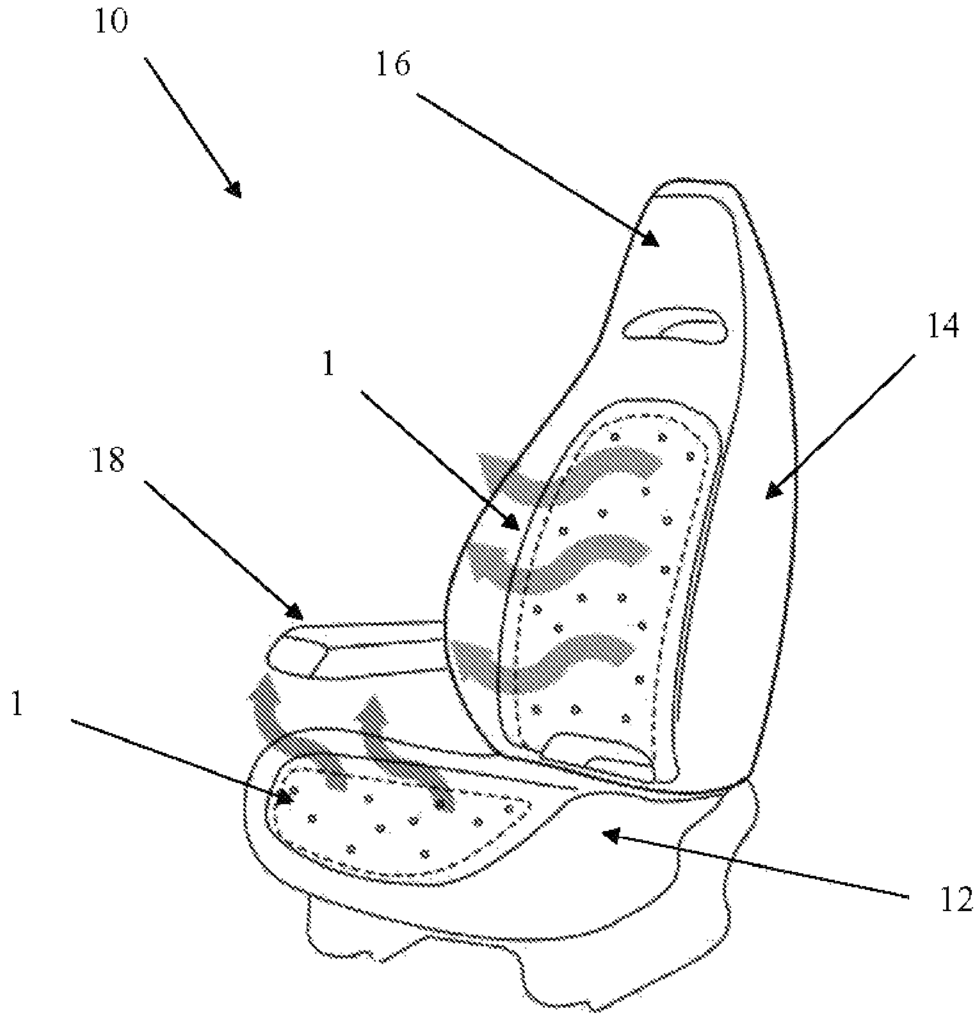
FIG. 1 schematically shows a vehicle seat provided with a heating device according to a first preferred embodiment of the invention.

By way of non-limiting example, a vehicle seat 10 according to a preferred embodiment invention is schematically shown in FIG. 1.

The vehicle seat 10 includes a seat cushion 12 and a seat backrest 14. In the shown example, the vehicle seat 10 further comprises an armrest 18 and a headrest 16.

In a per se now manner, each component of the vehicle seat 10 includes a rigid supporting frame (not visible in FIG. 1), a padding, covering the rigid frame and guaranteeing an adequate comfort to the users, and an upholstery, fitted onto the padding and intended to provide the desired surface properties as well as the desired aesthetical appearance to the corresponding component.

In the embodiment of FIG. 1, a polyurethane-based foam charged with an electrically conductive filler 1 is used for manufacturing the padding of the seat cushion 12 and of the seat backrest 14.

In general, such polyurethane-based foam charged and/or impregnated with an electrically conductive filler 1 can be used for manufacturing the padding of the seat cushion 12 or one or more portions thereof and/or for manufacturing the padding of the seat backrest 14 or one or more portions thereof.

In addition, such polyurethane-based foam charged and/or impregnated with an electrically conductive filler 1 can be used for manufacturing the padding of the armrest 18 or one or more portions thereof and/or for manufacturing the padding of the headrest 16 or one or more portions thereof.

Figure 2:
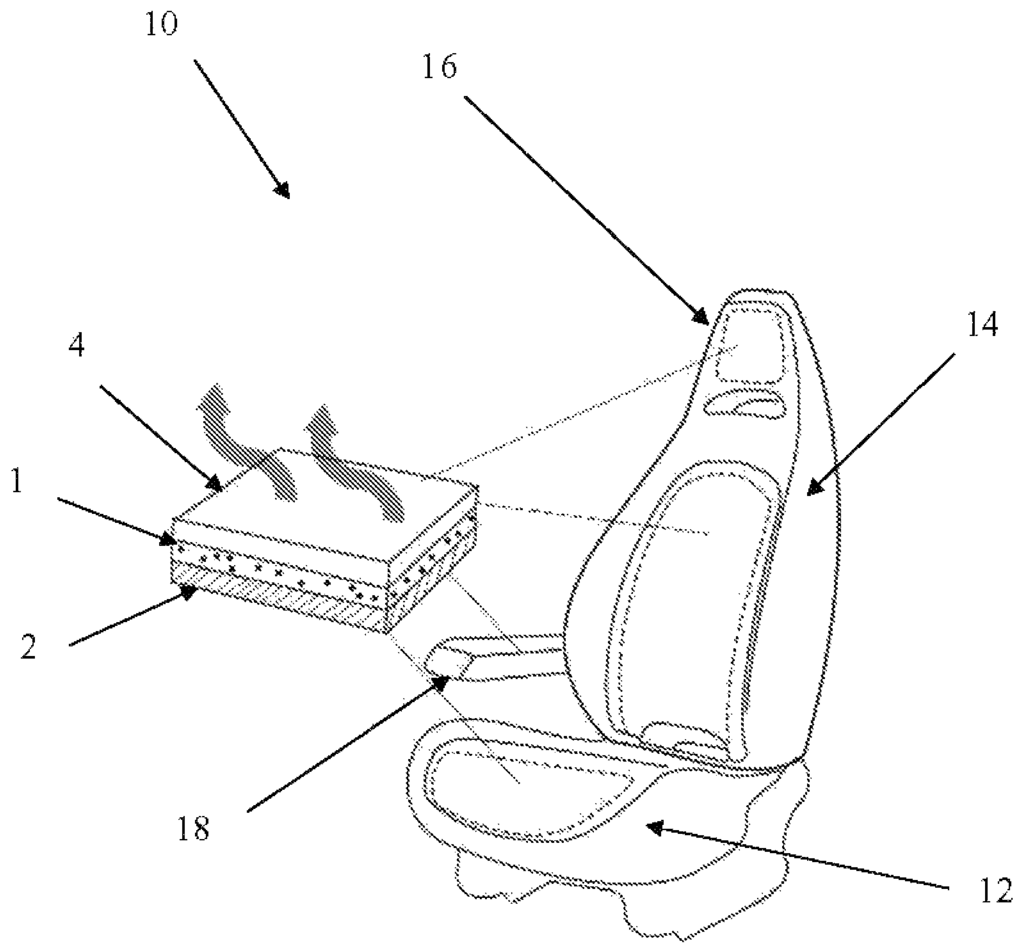
FIG. 2 schematically shows a vehicle seat provided with a heating device according to a first preferred embodiment of the invention.

FIG. 2 shows an alternative embodiment of the invention in which, a polyurethane-based foam charged and/or impregnated with an electrically conductive filler 1 is used for manufacturing the upholstery of the seat cushion 12 and of the seat backrest 14.

In general, such polyurethane-based foam charged with an electrically conductive filler 1 can be used for manufacturing the upholstery of the seat cushion 12 or one or more portions thereof and/or for manufacturing the upholstery of the seat backrest 14 or one or more portions thereof.

In addition, such polyurethane-based foam charged and/or impregnated with an electrically conductive filler 1 can be used for manufacturing the upholstery of the armrest 18 or one or more portions thereof and/or for manufacturing the upholstery of the headrest 16 or one or more portions thereof.

As shown in FIG. 2, according to this embodiment of the invention, the polyurethane-based foam charged and/or impregnated with an electrically conductive filler 1 will be sandwiched between an inner base layer 2 and an outer decorative layer 4, thus forming an intermediate layer of the upholstery with a multilayer structure.

Figure 3:
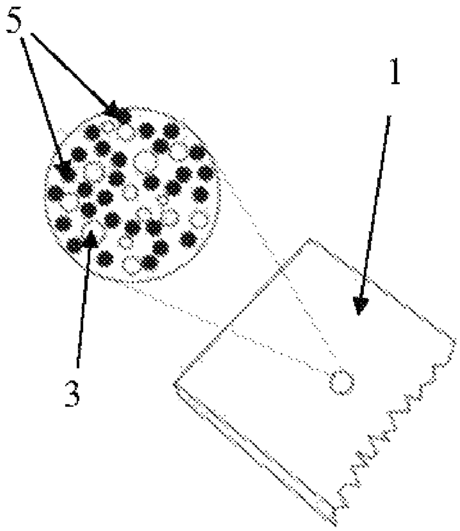
FIG. 3 schematically shows the structure of a possible polyurethane-based foam charged with an electrically conductive filler that can be used for manufacturing the heating device of the vehicle seats of FIGS. 1 and 2.
Figure 4:
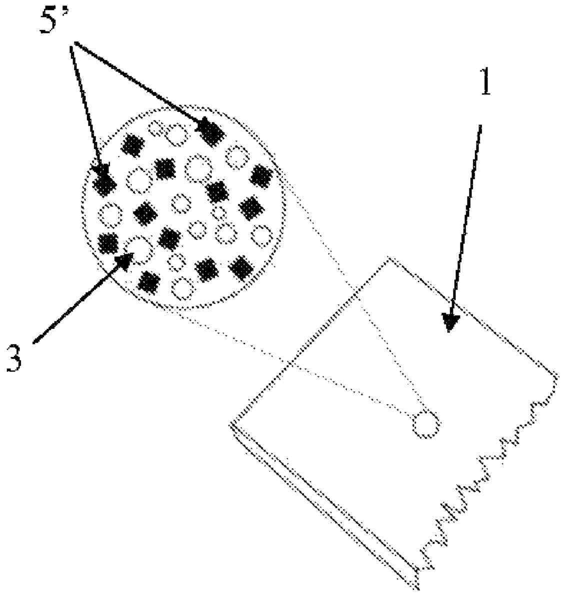
FIG. 4 schematically shows the structure of another possible polyurethane-based foam charged with an electrically conductive filler that can be used for manufacturing the heating device of the vehicle seats of FIGS. 1 and 2.
Figure 5:
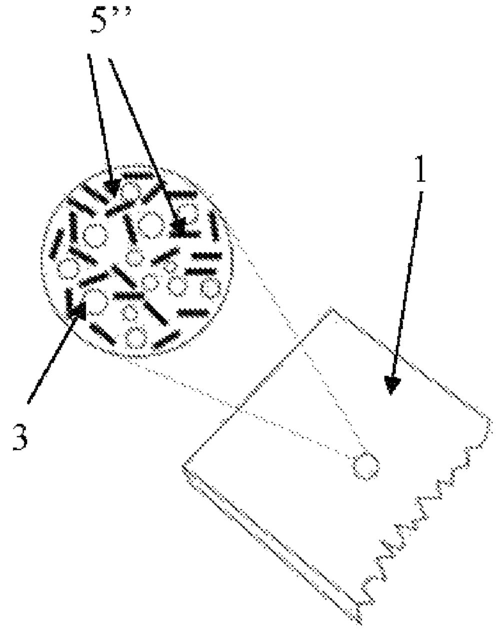
FIG. 5 schematically shows the structure of a further possible polyurethane-based foam charged with an electrically conductive filler that can be used for manufacturing the heating device of the vehicle seats of FIGS. 1 and 2.

As better shown in FIGS. 3-5, the polyurethane-based foam charged and/or impregnated with an electrically conductive filler 1 comprises a polyurethane matrix 3 charged and/or impregnated with electrically conductive particles 5, 5', 5".

The conductive particle can be carbon-based particles and/or metal-based particles, wherein metal-based particles are meant to include both metal and alloys that are electrically conductive.

Such conductive particles can be three-dimensional particle 5, such as metal particles and/or carbon black particles (see FIG. 3), substantially two-dimensional particles 5', such as graphite or graphene particles or graphene oxide or graphene nanoplatelets (see FIG. 4), substantially monodimensional particles 5", such as carbon fibres or carbon nanotubes (see FIG. 5), or any combination thereof.

Depending on the characteristics of the matrix 3 and of the filler particles 5, 5', 5", the concentration of such filler particles will be selected in order to be in the range between the percolation threshold and the saturation threshold of the resulting composite material.

Preferably, in order to effectively use the polyurethane foams charged with electrically conductive fillers for generating heat, the concentration of electrically conductive particle will be selected so as to be close to the saturation threshold, for instance in the 50% of the range between the percolation threshold and the saturation threshold closer to the saturation threshold, preferably in the 20% of said range closer to the saturation threshold.

In a manner known per se, the polyurethane matrix 3 of the foam is obtained from a first component containing at least one isocyanate and a second component containing at least one polyol.

The first and second components are mixed and poured into a metal mould, thus allowing the expansion and formation of the foam. The expansion is due to the carbon dioxide produced by the reaction between isocyanates and water, while gelation (which is responsible of the softness and flexibility of the foam) is obtained by the reaction between isocyanates and the —OH groups of polyols.

If use of a foam charged with an electrically conductive filler is envisaged, in order to obtain the foam of the invention, electrically conductive particles 5, 5', 5" are added to the first component or to the second component. The component is then subjected to a mixing step, intended to obtain a uniform distribution of the conductive particles within the component and, subsequently, in the resulting foam matrix. Such mixing step can be carried out, for instance, by mechanical stirring, by magnetic stirring, or by applying ultrasonic vibrations.

Said mixing step can be optionally followed by a step of thermal treatment, allowing to consolidating the resulting foam matrix. As mentioned above, the concentration of electrically conductive particles will be selected so that the resulting composite material is in the range between the percolation threshold and the saturation threshold. More in detail, such concentration will be preferably sufficiently high to ensure a good thermal conductivity of the resulting foam, so as to provide optimum transmission of generated heat to the outer surface of the vehicle seat; on the other hand, such concentration will be preferably sufficiently low to prevent the foam from becoming unstable or collapsing due to gravity effects related to the excessive presence of filler in the polyurethane matrix.

Thanks to the presence of electrically conductive particles, the foam charged with an electrically conductive filler 1 can be used for generating heat by Joule effect.

However, the Applicant has observed that addition of electrically conductive particles, namely in a concentration suitable for ensuring a good thermal/electrical conductivity of the resulting foam, might result in a deterioration of the mechanical properties of such foam, and even in the risk that the cell structure of the foam collapses.

Since according to the invention the foam is used as padding and/or upholstery of the vehicle cockpit component, such deterioration of its mechanical properties is not envisaged.

Accordingly, measures are taken in order to provide a compensation to the deterioration of the foam mechanical properties due to the addition of the electrically conductive particles.

In a preferred embodiment of the invention, such measures include addition of one or more blowing agents to the first component and/or to the second components used for manufacturing the foam.

More particularly, the type and amount of blowing agent(s) will be selected as a function of the concentration of electrically conductive particles.

In addition, other optional ingredients, including catalysts, surfactants, conductive fillers and other suitable chemical reagents, may be added to the first component and/or to the second components used for manufacturing the foam according to desired mechanical properties of the resulting polyurethane matrix.

If use of a foam impregnated with an electrically conductive filler is envisaged, in order to obtain the foam of the invention, the polyurethane foam is immersed at least once in a solution containing at least one binder and at least one conductive filler, both uniformly distributed in the solution by mechanical agitation, by magnetic agitation or by applying ultrasonic vibrations.

Also in this case, during manufacturing of the polyurethane foam one or more blowing agents may be added into the composition, in order to compensate the deterioration of the foam mechanical properties due to subsequent impregnation with the electrically conductive filler.

Also in this case, a final step of thermal treatment, allowing to consolidating the foam matrix, could be envisaged.

It will be evident to the person skilled in the art that it will also be possible to provide a combination of the two techniques described above, and a polyurethane foam could be initially charged with an electrically conductive filler during its production, and then impregnated with an electrically conductive filler.

In this case, the electrically conductive filler used for charging the polyurethane foam can be either of the same type as the one used for impregnating the foam, or of a different type.

The polyurethane foam charged and/or impregnated with an electrically conductive filler can be used for generating heat by Joule effect.

To this purpose, according to the invention said foam charged and/or impregnated with an electrically conductive filler 1 is directly connected to means for generating a potential difference in order to obtain a heating (i.e. heat generating) device.

Figure 6:
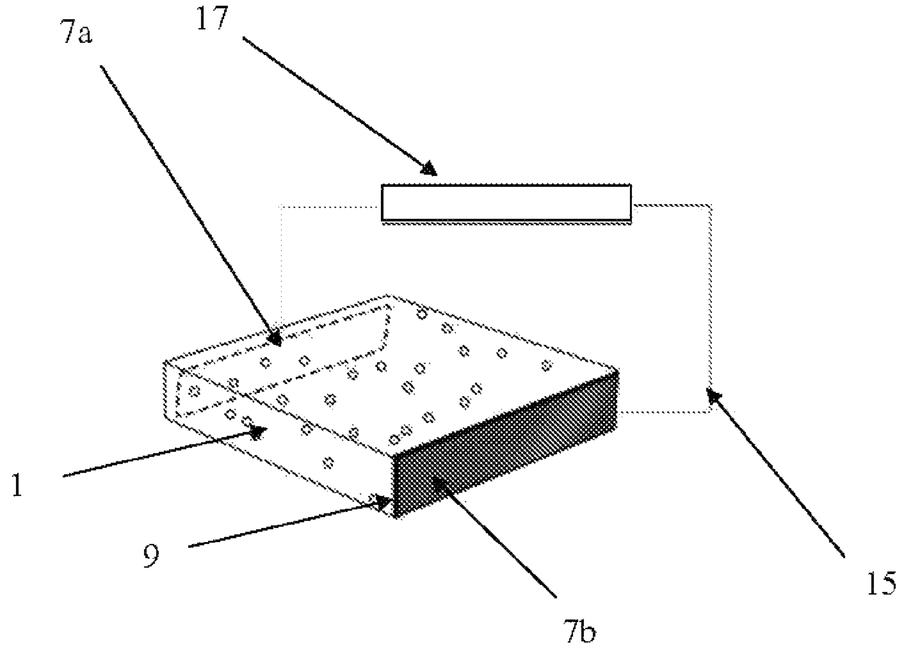
FIG. 6 schematically shows a first possible construction of the heating device to be used in the vehicle seat of FIG. 1 or FIG. 2.
Figure 7:
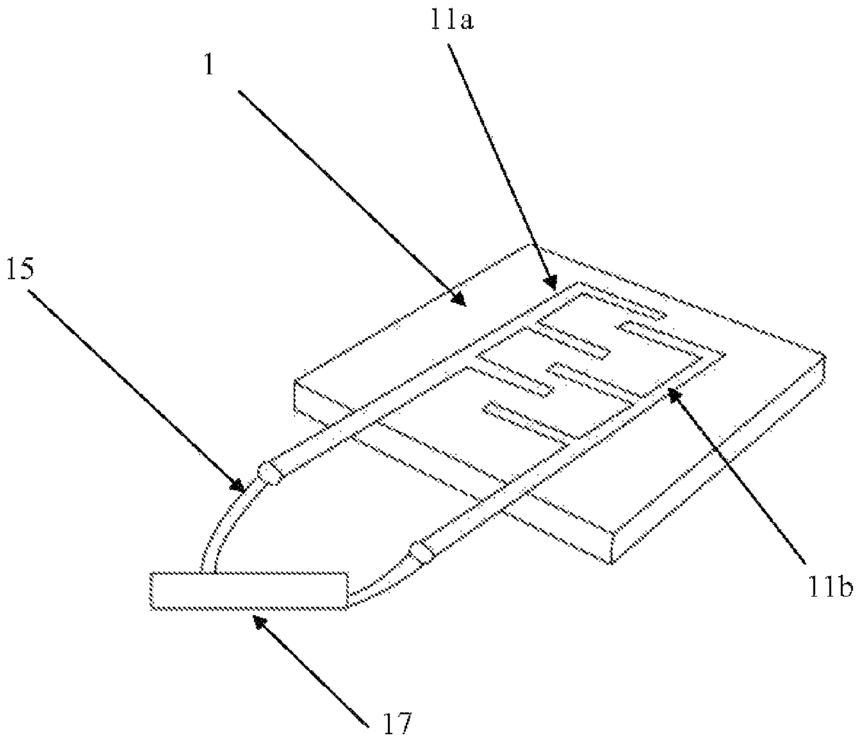
FIG. 7 schematically shows a second possible construction of the heating device to be used in the vehicle seat of FIG. 1 or FIG. 2.
Figure 8:
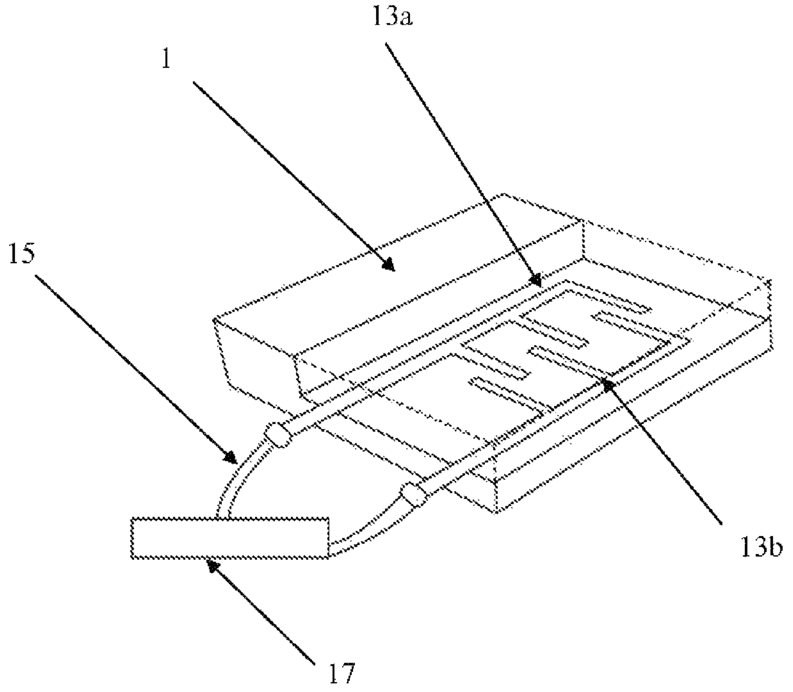
FIG. 8 schematically shows a third possible construction of the heating device to be used in the vehicle seat of FIG. 1 or FIG. 2.

FIGS. 6-8 schematically show possible constructions of such heating device.

In the example of FIG. 6, the polyurethane foam charged and/or impregnated with an electrically conductive filler 1 is placed between a pair of metal electrodes 7*a*, 7*b* and coupled to them; said electrodes 7*a*, 7*b* being preferably placed on opposite sides of the foam and coupled to said foam by means of a conductive glue or paste or resin 9.

In the example in FIG. 7, the polyurethane foam charged and/or impregnated with an electrically conductive filler 1 is placed between a pair of electrodes 11*a*, 11*b* and coupled to them; said electrodes 11*a*, 11*b* being obtained from flexible printed circuit boards (FPCB).

Such flexible printed circuit boards may be replaced by electrically metal-based conductive inks, which can be printed on the foam for forming a pair of electrodes.

In the examples of FIG. 8, a pair of metal electrodes 13*a*, 13*b* are embedded in the polyurethane foam charged and/or impregnated with electrically conductive fillers 1. In this configuration, the metal electrodes 13*a*, 13*b* are preferably shaped as frame elements.

In all the above configurations, the electrodes 7*a*, 7*b*, 11*a*, 11*b*, 13*a*, 13*b* will be connected to a control and power generation circuit 15 comprising a control unit 17.

The control unit 17 is configured to apply an adequate potential difference between the electrodes, so that an electrical current passes through the polyurethane foam charged and/or impregnated with electrically conductive fillers 1 and heat is generated by Joule effect.

The control unit 17 is further configured to detect the electrical resistance offered by the polyurethane foam charged and/or impregnated with electrically conductive fillers 1 and to derive the temperature of such foam from the detected resistance, thanks to the relationship between temperature and electric resistivity of the foam.

In view of the above, temperature sensors can be advantageously omitted.

It is to be noted that the concentration of electrically conductive particles in the polyurethane foam can be selected so as to trigger a mechanism of self-regulation of the temperature of the resulting composite material: by applying a constant potential difference, the polyurethane foam charged and/or impregnated with electrically conductive fillers 1 reaches and maintains the desired temperature. Therefore, it can be considered a self-regulating heating device, which does not need the presence of temperature sensors.

By way of non-limiting examples, a foam charged with an electrically conductive filler according to the present invention could be obtained as follows:

Example 1: The foam is obtained through the reaction between polyol and isocyanate components, and at least one of them is containing nickel as metal-based electrically conductive filler. First, the polyol component is prepared by mixing and blending at least one polyol with one or more blowing agents. The polyols are polyether-based segments containing poly-ethylene oxide and poly-propylene oxide. The blowing agent is water. One or more surfactant and one or more catalysts may also be added. For instance, a silicone-based surfactant may be used and the catalysts can be primary, secondary, tertiary amines. In this example, the nickel particles are mixed in the polyol component by using mechanical stirring, in order to achieve uniform distribution of particles in the component. The nickel particles concentration is 50 wt %, close to saturation operating region. Then the isocyanate component, which could be toluene diisocyanate (TDI) or methylene diphenyl diisocyanate (MDI), is added to polyol component. The mixed components are poured into the mould, in order to obtain the foam as heater device. The obtained foam is characterized by a percolation threshold equal to 45 wt %, and a saturation threshold equal to 70 wt %.

Example 2: The foam is obtained through the reaction between polyol and isocyanate components, and at least one of them is containing carbon nanotubes as carbon-based electrically conductive filler. First, the polyol component is prepared by mixing and blending at least one polyol with one or more blowing agents. The polyols are polyether-based segments containing poly-ethylene oxide and poly-propylene oxide. The blowing agent is water. One or more surfactant and one or more catalysts may also be added. For instance, a silicone-based surfactant may be used and the catalysts can be primary, secondary, tertiary amines. In this example, the carbon nanotubes particles are mixed in the polyol component by using ultrasonication, in order to achieve uniform distribution of particles in the component. The carbon nanotubes particles concentration is 5 wt %, close to saturation operating region. Then the isocyanate component, which could be toluene diisocyanate (TDI) or methylene diphenyl diisocyanate (MDI), is added to polyol component. The mixed components are poured into the mould, in order to obtain the foam as heater device. The obtained foam is characterized by a percolation threshold equal to 1 wt %, and a saturation threshold equal to 6 wt %.

In both examples, the filler concentration is chosen in order to obtain a device with a good heating efficiency. The examples allow to understand that the filler type and size affect the filler concentration that is needed to obtain a high-performance heating device intrinsic to the vehicle seat.

On the other hand, the blowing agents are chosen in order to obtain a device with good mechanical properties, despite the addition of the filler.

As a non-limiting example, a foam impregnated with an electrically conductive filler according to the invention could be obtained as follows:

Example 3: Graphene nanoplates are dispersed in a tetrahydrofuran-based solution. At least one polyol is introduced into the solution, which polyol will act as a binder between the graphene nanoplates and polyurethane foam. The graphene nanoplates and the binder are evenly dispersed in the solution by magnetic agitation. The weight concentration of the graphene nanoplates in the tetrahydrofuran solution is 5%. The polyurethane foam (already formed) is immersed in the solution so that it is impregnated with the graphene nanoplates. Subsequently, the polyurethane foam is dried in an oven at a temperature of 60° C. in order to remove the residual solution. The impregnation, and subsequent drying, is repeated three times.

It is evident that the above detailed description has been given by way of example and several modifications and variations are possible without departing from the scope of protection of the invention as defined by the appended claims.

In detail, the materials used for manufacturing the polyurethane matrix, the nature and concentrations of the electrically conductive particles used as filler, the shape and size of the resulting foam as well as the specific constructional features of the electrodes and of the circuit connected thereto can be selected by the person skilled in the art according to his/her own knowledge as a function of the specific application and desired performances.

Moreover, the invention can be applied to a wide variety of component of the vehicle cockpit, including vehicle seats, inner panels of the vehicle doors and the cockpit headliner

The invention claimed is:

1. A vehicle cockpit component, comprising:
a supporting frame; and
a padding fitted on the supporting frame, the padding comprising a polyurethane-based foam matrix that includes an electrically conductive filler;
wherein a concentration of electrically conductive filler in the polyurethane-based foam matrix is in a range between a minimum threshold, corresponding to a quantity of electrically conductive filler needed to trigger a first conductive pathway in the polyurethane-based foam matrix, and a maximum threshold, corresponding to a saturation of conductive pathways in the polyurethane-based foam matrix, without reaching the maximum threshold and remaining within 50% of said range closer to the maximum threshold so that the polyurethane-based foam matrix is non-collapsed, thus providing mechanical properties required of a cushioning material;
wherein the polyurethane-based foam matrix with the electrically conductive filler is directly connected to means for generating a voltage difference, whereby heat is generated by Joule effect in the padding when the voltage difference is applied; and
wherein one or more portions of the padding provide both a cushioning material and a heating device of the vehicle cockpit component.

2. The vehicle cockpit component according to claim 1, wherein the means for generating a voltage difference includes a pair of metal electrodes, wherein the polyurethane-based foam matrix with the electrically conductive filler is arranged between the pair of metal electrodes and is coupled to the pair of metal electrodes, and wherein the pair of metal electrodes is bonded to the polyurethane-based foam matrix with the electrically conductive filler and is connected to a control and power generation circuit.

3. The vehicle cockpit component according to claim 1, wherein the means for generating a voltage difference includes a pair of electrodes, wherein the polyurethane-based foam matrix with the electrically conductive filler is arranged between the pair of electrodes and is coupled to the pair of electrodes, and wherein the pair of electrodes is obtained by means of flexible printed circuit boards and is connected to a control and power generation circuit.

4. The vehicle cockpit component according to claim 1, wherein the means for generating a voltage difference includes a pair of electrodes, wherein the polyurethane-based foam matrix with the electrically conductive filler is arranged between the pair of electrodes and is coupled to the pair of electrodes, and wherein the pair of electrodes is obtained by means of printed conductive inks and is connected to a control and power generation circuit.

5. The vehicle cockpit component according to claim 1, wherein the means for generating a voltage difference includes a pair of electrodes, wherein the polyurethane-based foam matrix with the electrically conductive filler is provided with the pair of metal electrodes which is embedded in the polyurethane-based foam matrix with the electrically conductive filler and is connected to a control and power generation circuit.

6. The vehicle cockpit component according to claim 1, wherein the polyurethane-based foam matrix with the electrically conductive filler is a polyurethane foam charged with the electrically conductive filler.

7. The vehicle cockpit component according to claim 1, wherein the vehicle cockpit component is selected from the group consisting of a vehicle seat, a vehicle seat cushion, a vehicle seat backrest, a vehicle seat armrest, a vehicle seat headrest, an inner panel of a vehicle door, and a cockpit headliner.

8. The vehicle cockpit component according to claim 6, the electrically conductive filler is dispersed in the polyurethane-based foam matrix, and wherein the minimum threshold corresponds to a percolation threshold of the polyurethane-based foam matrix and the maximum threshold corresponds to a saturation threshold of the polyurethane-based foam matrix.

9. The vehicle cockpit component according to claim 8, wherein the electrically conductive filler is selected from the group consisting of metal particles, carbon black particles, graphite particles, graphene particles, graphene oxide, graphene nanoplatelets, carbon fibres, and carbon nanotubes.

10. The vehicle cockpit component according to claim 1, wherein the polyurethane-based foam matrix with the electrically conductive filler is a polyurethane foam impregnated with the electrically conductive filler.

11. A vehicle cockpit component, comprising:

a supporting frame; and an upholstery fitted on the supporting frame, the upholstery including a polyurethane-based foam matrix that that includes an electrically conductive filler;

wherein a concentration of the electrically conductive filler in the polyurethane-based foam matrix is in a range between a minimum threshold, corresponding to a quantity of electrically conductive filler needed to trigger a first conductive pathway in the polyurethane-based foam matrix, and a maximum threshold, corresponding to a saturation of conductive pathways in the polyurethane-based foam matrix, without reaching the maximum threshold and remaining within 50% of said range closer to the maximum threshold so that the polyurethane-based foam matrix is non-collapsed, thus providing mechanical properties required of a cushioning material:

wherein the polyurethane-based foam matrix with the electrically conductive filler is directly connected to means for generating a voltage difference, whereby heat is generated by Joule effect in the upholstery when the voltage difference is applied; and wherein one or more portions of the upholstery provide both a cushioning material and a heating device of the vehicle cockpit component.

12. The vehicle cockpit component according to claim 11, wherein the means for generating a voltage difference includes a pair of metal electrodes, wherein the polyurethane-based foam matrix with the electrically conductive filler is arranged between the pair of metal electrodes and is coupled to the pair of metal electrodes, and wherein the pair of metal electrodes is bonded to the polyurethane-based foam matrix with the electrically conductive filler and is connected to a control and power generation circuit.

13. The vehicle cockpit component according to claim 11, wherein the means for generating a voltage difference includes a pair of electrodes, wherein the polyurethane-based foam matrix with the electrically conductive filler is arranged between the pair of electrodes and is coupled to the pair of electrodes, and wherein the pair of electrodes is obtained by means of flexible printed circuit boards and is connected to a control and power generation circuit.

14. The vehicle cockpit component according to claim 11, wherein the means for generating a voltage difference includes a pair of electrodes, wherein the polyurethane-based foam matrix with the electrically conductive filler is arranged between the pair of electrodes and is coupled to the pair of electrodes, and wherein the pair of electrodes is obtained by means of printed conductive inks and is connected to a control and power generation circuit.

15. The vehicle cockpit component according to claim 11, wherein the means for generating a voltage difference includes a pair of metal electrodes, wherein the polyurethane-based foam matrix with the electrically conductive filler is provided with the pair of metal electrodes which is embedded in the polyurethane-based foam matrix with the electrically conductive filler and is connected to a control and power generation circuit.

16. The vehicle cockpit component according to claim 11, wherein the polyurethane-based foam matrix with the electrically conductive filler is a polyurethane foam charged with the electrically conductive filler.

17. The vehicle cockpit component according to claim 11, wherein the polyurethane-based foam matrix with the electrically conductive filler is a polyurethane foam impregnated with the electrically conductive filler.

18. The vehicle cockpit component according to claim 16, wherein the electrically conductive filler is dispersed in the polyurethane-based foam matrix, and wherein the minimum threshold corresponds to a percolation threshold of the polyurethane-based foam matrix and the maximum threshold corresponds to a saturation threshold of the polyurethane-based foam matrix.

19. The vehicle cockpit component according to claim 18, wherein the electrically conductive filler is selected from the group consisting of metal particles, carbon black particles, graphite particles, graphene particles, graphene oxide, graphene nanoplatelets, carbon fibres, and carbon nanotubes.

20. The vehicle cockpit component according to claim 11, wherein the vehicle cockpit component is selected from the group consisting of a vehicle seat, a vehicle seat cushion, a vehicle seat backrest, a vehicle seat armrest, a vehicle seat headrest an inner panel of a vehicle door, and a cockpit headliner.

* * * * *